Patented July 26, 1949

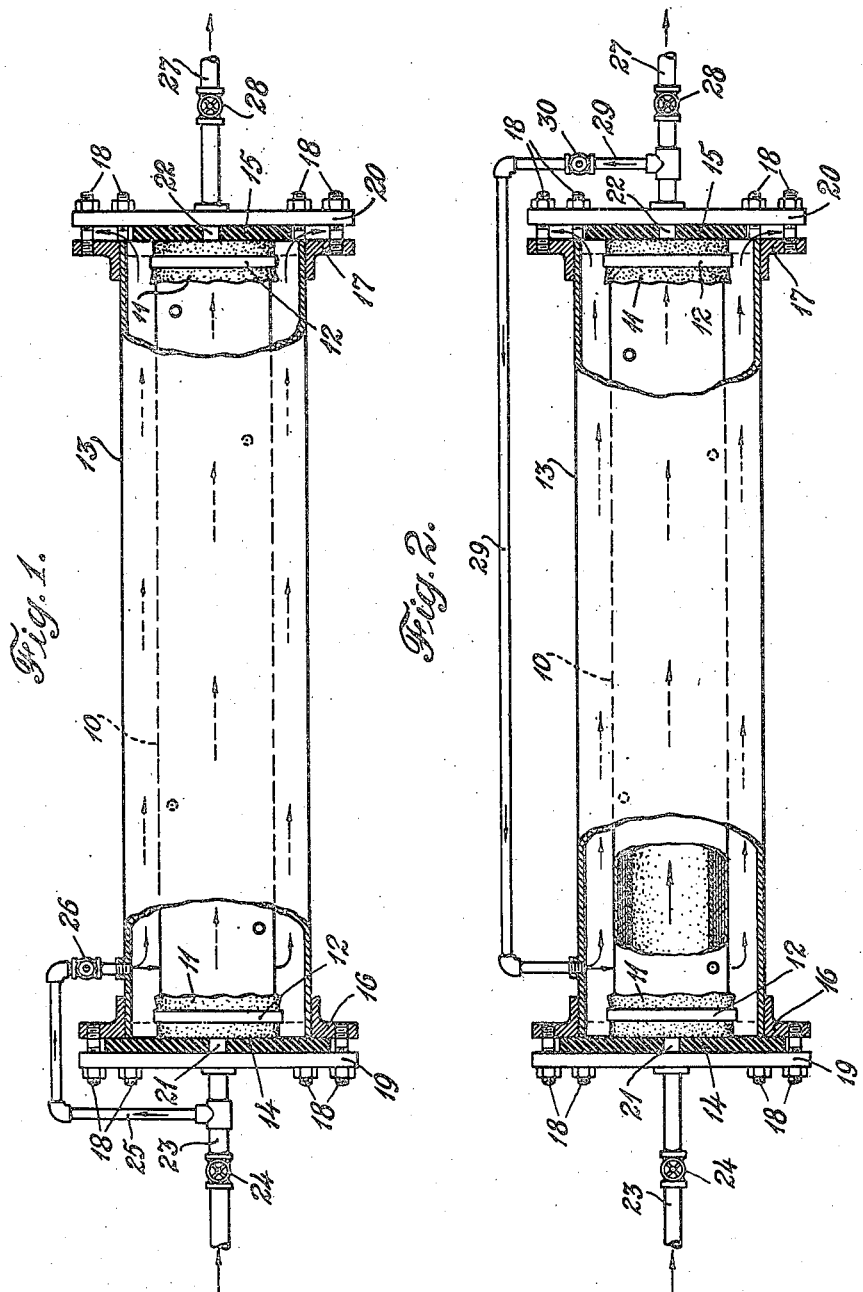

2,477,180

UNITED STATES PATENT OFFICE 2,477,180

APPARATUS FOR MAKING PLYWOOD TUBING

Charles B. Hemming, New Rochelle, N. Y., assignor to United States Plywood Corporation, New York, N. Y., a corporation of New York Application September 1, 1943, Serial No. 500,770

2 Claims. (Cl. 144—268)

The present invention relates to a method and apparatus for the molding of plywood in the form of tubes and the like, and is an improvement on an apparatus described and claimed in the copending application of Theodore E. Ilch, Serial No. 457,894, filed September 10, 1942, and issuing into Patent No. 2,411,542, dated Nov. 26, 1946.

In the process described in the above mentioned application, a plurality of sheets of wood veneers are rolled up and inserted in succession into a slotted mandrel made of steel or other metal, the mandrel being contracted by means of suitable clamps until its internal diameter is equal to the external diameter of the finished plywood tube, the individual veneer sheets being inserted in such a manner that the joints are staggered so that no continuous joint from the innermost to the outermost veneers is present in the finished tube. After being suitably positioned within the mandrel, the built-up tube of individual veneers, which are provided with a thermoplastic or thermosetting glue between the veneers, is subjected to heat and pressure applied by means of an expansible rubber tube inserted within the mandrel and inside of the coiled veneers. It is necessary to apply a pressure of about 90 lbs. per square inch at the corresponding steam temperature to effect fusion of the adhesive and insure proper molding of the veneers against the interior of the mandrel.

In the practice of this process, it has been found that higher steam pressures, even though frequently desirable, cannot be employed because the corresponding steam temperatures become too high and cause injury to the wood. On the other hand, the number of rejects has turned out to be rather high, and the main cause of the difficulty, as I have found, is that the outermost layers of veneers, particularly in a tube which is to have a considerable wall thickness, do not receive an adequate amount of heat within the time allotted for the fusion of the adhesive, to effect sufficient fusion of the outer layers of adhesive and proper molding, the innermost layers of adhesive frequently setting (where the adhesive is of the thermo-setting type) before the outermost adhesive layers have begun to fuse, so that proper adjustment between the veneers and proper molding do not take place. Even where a thermoplastic adhesive is employed, it frequently occurs that the outermost layers of adhesive are not heated to a sufficiently high temperature to reach a sufficiently fluid condition before the time allowed for the molding operation has elapsed. Furthermore the relatively cold mandrel acts as a sink of heat energy, absorbing and radiating heat so fast that it is difficult and often impossible to maintain an adequate temperature at the outermost glue line while avoiding an excess of temperature inside.

In considering the problem of devising ways and means of overcoming this difficulty, it had to be borne in mind that the mandrel is necessarily perforated to permit the escape of gases and vapors during the heating and molding. It was, therefore, impractical to surround the mandrel with an atmosphere of steam under pressure, as thereby a counter-pressure would be exerted against the molding pressure, thereby reducing the requisite differential molding pressure to a value below the optimum. This differential could not be restored to the optimum by reducing the pressure of the steam fed into the rubber bag in the interior of the mandrel because that would be accompanied by a rise in temperature of the innermost layers of veneers to a point beyond a safe value.

I have found that a simple and satisfactory solution of the problem is afforded by surrounding the mandrel with a casing which is open to the atmosphere and bleeding steam into such casing through a reducing valve either connected to the exhaust from the molding bag or from the steam line in advance thereof, the steam being permitted to vent through the casing so as to avoid the building up of any considerable degree of back pressure. In this way the mandrel is maintained at a sufficiently high temperature to prevent the loss of heat reaching the outermost layers of veneers from the molding bag while at the same time a certain amount of heat may even be supplied to the outer veneers by the mandrel. In this way, more rapid and more uniform heating of the veneers is assured, and even with the use of a thermo-setting adhesive, simultaneous fluidity of all of the layers of the adhesive is maintained and a properly molded article is thereby secured.

A satisfactory construction in accordance with the invention is illustrated in two embodiments in the accompanying drawing, wherein Fig. 1 is a partly cut-away view showing the mandrel, ready for molding of the tubing therein, in position in the outside or cooking casing, and showing one embodiment of the apparatus constructed in accordance with my invention; and Fig. 2 is a similar view of the second embodiment of my invention.

Referring more particularly to the drawing, in which similar reference characters identify similar parts in the two views, the cylindrically rolled up or curled sheets of plywood veneers are slid into the perforated steel mandrel 10, shown in Fig. 2. A flexible, fluid-tight, tubular membrane, as described in the aforesaid Ilch application, is positioned in the steel mandrel within the assembled veneers, the ends of such tubular membrane being doubled back for a short distance over the outside of the mandrel, as shown at 11, and an outer ring or sleeve 12 is slipped on the folded back ends of the membrane to hold the fabric in place. The mandrel assembly is positioned within an outer casing 13, being substantially centrally disposed therein. The end of the mandrel 10 abuts tightly against the two gaskets 14 and 15 positioned within, and bearing against, companion plates 16 and 17, respectively. A plurality of bolts 18 are used to press the companion plates 16 and 17 against the end plates 19 and 20, respectively, of the casing. In this manner the sealing of both ends of the mandrel 10 is accomplished. The whole of the fluid-tight tubular membrane is thus sealed except for an aperture 21 in the center of the gasket 14, and a like aperture 22 in the center of the gasket 15. These apertures 21 and 22 are for the admission and egress respectively of the heating and cooling fluid which is usually high pressure steam.

In accordance with the first embodiment of my invention as illustrated in Fig. 1, the high pressure steam is admitted through the pipe 23, connecting with the aperture 21 and having the main control valve 24 in such admission pipe. From the pipe 23 a bypass line 25, having a reducing valve 26 therein, bypasses some of the high pressure steam into the casing or chamber 13, the steam passing therethrough and completely surrounding the mandrel 10, and being exhausted at the opposite end of the casing 13 through the space between the companion plate 17 and the end plate 20. The high pressure steam, passing through the tubular membrane positioned within the steel mandrel 10, is exhausted through outlet pipe 27 having control valve 28 therein.

In accordance with the embodiment just described, steam is bled into the casing 13 through a reducing valve in the line leading from the high pressure steam line in advance of the molding bag.

In accordance with the second embodiment of my invention, shown in Fig. 2, the bleeding of the steam into the casing is accomplished through a reducing valve connected to the exhaust from the molding bag. In accordance with such embodiment of my invention, the bypass pipe 29 leads steam from the high pressure steam exhaust line 27 through a reducing valve 30 to a point at the opposite end of the casing 13 near the high pressure steam inlet, the exhaust steam being permitted to vent through the casing completely surrounding the steel mandrel 10 and then permitted to exhaust between the companion plate 17 and the end plate 20.

In accordance with the embodiments of my invention as described hereinabove, the steam bled from the high pressure steam inlet or the high pressure steam outlet is permitted to pass through the casing surrounding the steam mandrel in which the molding bag is enclosed, to prevent the building up of any considerable degree of back pressure in the apparatus.

I claim:

1. In an apparatus, a mandrel, an inflatable membrane positioned within said mandrel and adapted to act upon work positioned in said mandrel, means for closing the end of said mandrel, an outer casing for said mandrel, means for supplying a fluid to the interior of said mandrel, means connected to said last mentioned means for supplying a fluid to the exterior of said mandrel, a pressure reducing valve in said last mentioned means, means to permit the fluid surrounding the mandrel to escape to the atmosphere, said mandrel being perforated in order to allow moisture to escape, and also to permit the fluid outside of said mandrel to act upon the work within the mandrel.

2. In an apparatus, a mandrel, an inflatable membrane positioned within said mandrel, an outer casing for said mandrel, means for supplying a fluid under pressure to the interior of said mandrel, means connected to said last mentioned means for supplying fluid under pressure to the exterior of said mandrel, a pressure reducing valve in said last mentioned means, means to permit the fluid surrounding the mandrel to escape to the atmosphere, said mandrel being perforated in order to allow moisture to escape, and also to permit the counter-pressure outside of said mandrel to hold the differential molding pressure below the optimum value, said membrane having marginal ends extending over the ends of the mandrel and secured to said mandrel by a holding ring, and means for closing the end of said mandrel, said closure means comprising a plate pressing against the end of said mandrel whereby an opening in said plate registers with the interior of said membrane.

CHARLES B. HEMMING.

REFERENCES CITED

The following references are of record in the file of this patent:

UNITED STATES PATENTS

| Number | Name | Date |
|---|---|---|
| 146,370 | Taylor | Jan. 13, 1874 |
| 1,612,508 | Henderson | Dec. 28, 1926 |
| 2,037,483 | Paschke | Apr. 14, 1936 |
| 2,276,004 | Vidal et al. | Mar. 10, 1942 |
| 2,312,332 | Gramelspacher | Mar. 2, 1943 |
| 2,331,296 | Bendix | Oct. 12, 1943 |
| 2,411,542 | Ilch | Nov. 26, 1946 |

FOREIGN PATENTS

| Number | Country | Date |
|---|---|---|
| 560,349 | Germany | Oct. 1, 1932 |
| 637,029 | Germany | Oct. 21, 1936 |